H. P. HASKIN & J. H. REIGART.
CUTTING APPARATUS FOR HARVESTERS.
No. 191,675.  Patented June 5, 1877.
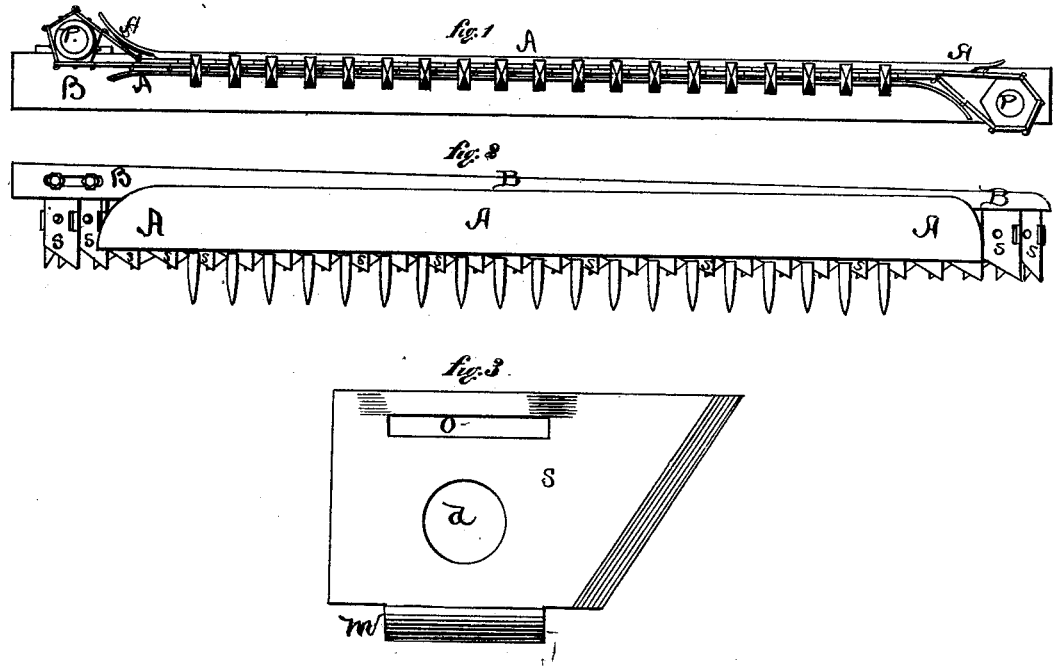

UNITED STATES PATENT OFFICE.

HENRY P. HASKIN AND JAMES H. REIGART, OF BELOIT, WISCONSIN.

IMPROVEMENT IN CUTTING APPARATUS FOR HARVESTERS.

Specification forming part of Letters Patent No. 191,675, dated June 5, 1877; application filed March 16, 1877.

*To all whom it may concern:*

Be it known that we, HENRY P. HASKIN and JAMES H. REIGART, of the city of Beloit, in the county of Rock and State of Wisconsin, have invented certain new and useful Improvements in Reaping and Mowing Machines; and we do hereby declare that the following is a full, clear, and exact description thereof, which will enable others skilled in the art to which it appertains to make and use the same, reference being had to the accompanying drawings and to the letters of reference marked thereon, which form a part of this specification, similar letters of reference indicating corresponding parts.

This invention relates to certain improvements in reaping and mowing machines, and consists in the herein-described construction, method of arrangement, and the cutting mechanism necessarily connected with and employed in machines containing our invention; one of the chief objects of our invention being to provide and furnish a cutting device for reaping and mowing machines, the cutting efficiency of which shall at least be fully equal (and, we think, far superior) to any other, at the same time greatly decreasing the propelling force usually required to operate or drive the sickle in machines employing the old-fashioned vibrating sickle; and we also think that machines using our improved style of cutter will not require more than about one-half the usual motive-power, and therefore may advantageously be made much lighter in material required in their construction; also, materially diminishing the cost of machines containing our improvements herein stated, and hereinafter fully described, reference being had to the said drawings, in which—

Figure 1 is a horizontal or front view of our said improved sickle or cutting device. Fig. 2 is a vertical or perspective view of our said cutting device, and Fig. 3 is a perspective or plan view of a single enlarged sickle-section detached; and in which said drawings—

Letter B, Fig. 2, most plainly represents the sill or front of the reaper platform or frame having our improved sickle or cutting device attached and secured thereto, as shown, which will be readily understood by the letters of reference marked thereon, as hereinafter explained, and in which letters P and P' represent polygonal wheels or pulleys which carry the endless sickle, composed of the independent interchangeable sections S, which sickle is most plainly shown at Fig. 2.

These independent interchangeable sickle-sections, and the manner of their construction, are fully shown at Fig. 3, and are substantially as follows: Each section is stamped out of a single blank of sickle-steel, and completely finished for use, save as to grinding, sickleing, and tempering, and it will be observed that each sickle-section is complete in itself and interchangeable with every other similar section, so that, in case of accident to the sickle of any machine, injured sections may be replaced by new ones at slight expense and but little delay.

O is an elongated slot, and M is an open link or clasp-hook, which in forming the sickle is hooked into a corresponding slot, O, of another similar section, which two sections, thus joined together, constitute two links of the endless sickle, which is completely formed; and by, in like manner, joining such number of said sections S as will provide a sickle of suitable length, the last section at each end of the sickle so formed being joined together in the same manner as the intermediate sections, will complete the endless sickle, as will be plainly understood.

The polygonal wheel or pulley P is provided with suitable round or oval-headed projections X, which engage as cogs, with round orifices $d$ stamped in each of the sickle-sections in the formation thereof, shown and described as aforesaid, by means of which, when the machine is in use, a rotating motion is communicated to the sickle carrying the upper strand or half thereof from right to left, and the under half in the opposite direction, by means of the turning of the polygonal pulley P.

The function of the polygonal wheel P' is only for the purpose of tension and guide to the sickle, and of enabling it to make a short doubling turn at the outer end of the cut, and it will be seen that when in use the sickle S will be made to turn or travel over and around the polygonal pulleys P and P', and that, in their peculiar relations to the said sickle, propelling, guiding, and regulating the tension thereof, the wheel or pulley P will be above and the pulley P' below the straight cutting-line of the sickle, as shown.

G represents suitable finger-guards of peculiar construction, as shown, which have sufficient length and width in the slots therein provided to permit the double sickle to pass through them in reverse directions; and A A are suitable shields or guide-plates, as shown, which form a way or track for the sickle, by means of which, and by the employment of suitable mechanism, the sickle will be controlled and held in line, and will also press the ground surfaces or faces of the sickle just close enough together to work freely upon each other in opposite directions.

The cutting edges of the sections of which the sickle is composed make a continuous draw or shear cut, caused by the reverse transit motion of the upper and lower strands of the revolving sickle, as shown.

In passing around the polygonal wheel P, it will be seen that the lower half of the sickle is in line with the lower surface of said pulley, and at the pulley P' the relation of the sickle thereto is, in this respect, exactly reversed, as shown, and when at work the lower half of the sickle cuts toward the grain, and the upper half cuts toward the bull-wheel of the reaper, thus tending to gather and carry the grain in that direction.

In the drawings we do not present a full machine, for the reason that it seems unimportant to us to do more than exhibit the parts containing our invention.

The polygonal wheel P will be of such size as shall be found most available, and may be driven by chain-belt or gear, the propelling force being derived from the bull-wheel of the machine, communicated by suitable mechanism.

Having thus fully described the nature, object, manner of construction, and method of operating our invention, what we claim as our invention, and desire to secure by Letters Patent, is—

1. The sickle-section formed of a single piece, with slot O and hook M, for the purposes specified.

2. The endless sickle, made up of interchangeable sections formed in a single piece, and having slot O and hook M, constructed as described, and for the purposes set forth.

In testimony that we claim the foregoing as our own invention we affix our signatures in presence of two witnesses.

HENRY P. HASKIN.
JAMES H. REIGART.

Witnesses:
E. P. KING,
I. E. GOODALL.